United States Patent
Harwood et al.

(10) Patent No.: US 10,776,208 B2
(45) Date of Patent: Sep. 15, 2020

(54) DISTRIBUTED MEMORY CHECKPOINTING USING STORAGE CLASS MEMORY SYSTEMS

(71) Applicant: EMC IP Holding Company LLC, Hopkinton, MA (US)

(72) Inventors: John S. Harwood, Paxton, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 16/038,717

(22) Filed: Jul. 18, 2018

(65) Prior Publication Data

US 2020/0026603 A1  Jan. 23, 2020

(51) Int. Cl.
| G06F 11/00 | (2006.01) |
| G06F 11/14 | (2006.01) |
| G06F 11/10 | (2006.01) |
| H04L 29/08 | (2006.01) |

(52) U.S. Cl.
CPC ...... *G06F 11/1407* (2013.01); *G06F 11/1076* (2013.01); *G06F 11/1464* (2013.01); *H04L 67/1097* (2013.01); *G06F 2201/84* (2013.01)

(58) Field of Classification Search
CPC ............. G06F 11/1084; G06F 11/1088; G06F 11/1092; G06F 11/2053; G06F 11/2056; G06F 11/2058; G06F 11/00–0796; G06F 11/08–1425; G06F 11/1428–3696
USPC ................................................ 714/6.22, 1–57
See application file for complete search history.

(56) References Cited

U.S. PATENT DOCUMENTS

| 7,478,275 B1* | 1/2009 | Deolasee ............ G06F 11/1458 714/13 |
| 9,892,253 B1* | 2/2018 | Mehr ....................... G06F 21/52 |
| 10,216,949 B1* | 2/2019 | McKelvie ........... G06F 21/6227 |
| 2011/0107135 A1* | 5/2011 | Andrews ............... H04L 41/082 714/2 |
| 2013/0305101 A1* | 11/2013 | Gupta ..................... G06F 21/56 714/47.3 |
| 2014/0032535 A1* | 1/2014 | Singla .................. G06F 21/552 707/722 |
| 2014/0195480 A1* | 7/2014 | Talagala .............. G06F 12/0804 707/610 |

(Continued)

*Primary Examiner* — Sarai E Butler
(74) *Attorney, Agent, or Firm* — Ryan, Mason & Lewis, LLP (57) ABSTRACT

Systems and methods are provided for implementing memory checkpointing using a distributed non-volatile memory system. For example, an application runs on a plurality of server nodes in a server cluster. Each server node includes system memory having volatile system memory and non-volatile system memory. A current application state of the application is maintained in the system memory of one or more server nodes. A checkpoint operation is performed to generate a distributed checkpoint image of the current application state of the application. The distributed checkpoint image is stored in the non-volatile system memory of the plurality of server nodes. Fault-tolerant parity data is generated for the distributed checkpoint image, and the fault-tolerant parity data for the distributed checkpoint image is stored in the non-volatile system memory of one or more of the plurality of server nodes.

20 Claims, 5 Drawing Sheets

(56) References Cited

U.S. PATENT DOCUMENTS

| | | | |
|---|---|---|---|
| 2014/0281813 A1* | 9/2014 | Wakchaure | G06F 11/108 |
| | | | 714/766 |
| 2016/0139943 A1* | 5/2016 | Bezbaruah | G06F 9/45558 |
| | | | 718/1 |
| 2016/0274974 A1* | 9/2016 | Chen | G06F 3/067 |
| 2016/0378611 A1* | 12/2016 | Ljubuncic | G06F 11/1469 |
| | | | 714/19 |
| 2017/0031769 A1 | 2/2017 | Zheng et al. | |
| 2017/0132071 A1 | 5/2017 | Bradshaw et al. | |
| 2017/0269980 A1 | 9/2017 | Gupta et al. | |
| 2017/0300388 A1 | 10/2017 | Zheng et al. | |
| 2018/0203765 A1* | 7/2018 | Critchley | G06F 3/0689 |
| 2019/0188047 A1* | 6/2019 | Dao | G06F 9/5077 |

* cited by examiner

DISTRIBUTED MEMORY CHECKPOINTING USING STORAGE CLASS MEMORY SYSTEMS

FIELD

This disclosure relates generally to data storage techniques and, in particular, to techniques for managing checkpoint images in a distributed memory system.

BACKGROUND

Conventional checkpointing techniques are utilized in various types of computing systems as a means to provide some level of fault tolerance against system failures, e.g., server crashes. In general, a checkpointing process comprises generating a checkpoint image (or snapshot) of the current in-memory state of an application, so that the application can be restarted from that checkpoint in case of a system failure during execution of the application. The checkpointing process is particularly useful for long running applications that are executed in failure-prone computing systems.

For example, in a high-performance computing (HPC) domain, long running, heavy computing intensive processing tasks (e.g., training deep learning models) dominate the workloads of server resources within a computing server cluster, and such intensive processing tasks can take hours, days or even weeks to execute certain tasks and deliver results. It is common for a server within the computing system to experience some error at some point during the execution of a relatively long processing task, or otherwise have the processing task preempted at some point in the execution to execute a higher priority task. Such error can range from a software error, a memory failure, a power failure, or even a natural disaster. The process of recovering a computing result by re-executing the program from the beginning to the break point is generally not a good solution due to the long running time of the processing task and the heavy computing power requirements. Therefore, checkpointing a current program state in non-volatile storage is a more optimal solution to make the system robust and failure tolerant.

Checkpointing in a cloud environment faces many challenges. Such challenges include, but are not limited to, long synchronization overhead, large data movement over the network, significant use of system resources such as system memory and storage bandwidth, etc. In this regard, checkpointing in a cloud computing environment militates against single point checkpointing, wherein all the data is collected at one place and stored. Indeed, Big Data applications can involve terabyte levels of data, and transferring the data repeatedly to one machine for checkpointing wastes computation power, network bandwidth, and storage.

SUMMARY

Illustrative embodiments of the invention generally include systems and methods for implementing distributed memory checkpointing using a distributed non-volatile memory system (e.g., storage class memory system). For example, one embodiment includes a method which comprises running an application on a plurality of server nodes in a server cluster, wherein each server node includes system memory which comprises volatile system memory and non-volatile system memory, and maintaining a current application state of the application in the system memory of the plurality of server nodes. A checkpoint operation is performed to generate a distributed checkpoint image of the current application state of the application. The distributed checkpoint image is stored in the non-volatile system memory of the plurality of server nodes. Fault-tolerant parity data is generated for the distributed checkpoint image, and the fault-tolerant parity data for the distributed checkpoint image is stored in the non-volatile system memory of one or more of the plurality of server nodes.

Other embodiments of the invention include, without limitation, computing systems and articles of manufacture comprising processor-readable storage media.

DETAILED DESCRIPTION

Figure 1:
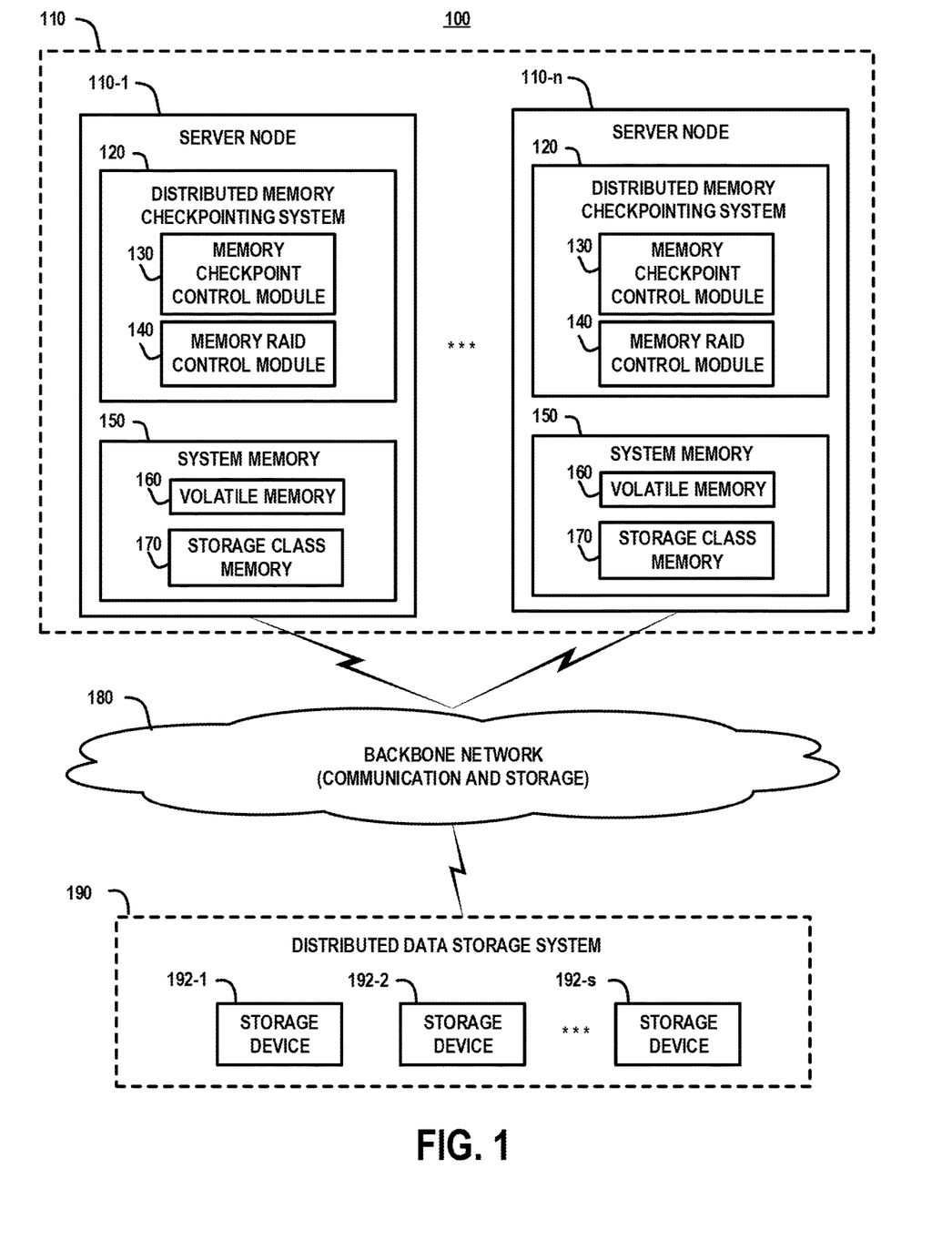
FIG. 1 is a high-level schematic illustration of a computing system which implements distributed memory checkpointing using a distributed storage class memory RAID system, according to an embodiment of the invention.

Illustrative embodiments of the invention will now be explained in further detail with regard to systems and methods for implementing distributed memory checkpointing using a distributed non-volatile memory system (e.g., storage class memory (SCM) system). Embodiments of the invention leverage SCM systems in novel ways in order to enhance checkpointing and failure recovery functionality. For example, FIG. 1 is a high-level schematic illustration of a computing system 100 which implements distributed memory checkpointing using a distributed storage class memory RAID system, according to an embodiment of the invention. The computing system 100 comprises a cluster of server nodes 110 comprising a plurality (n) of server nodes 110-1, . . . , 110-n (collectively, server nodes 110). The server nodes 110 comprise a distributed memory checkpointing system 120 which comprises a memory checkpoint control module 130 and a memory RAID control module 140. In addition, the server nodes 110 each comprise system memory 150 comprising volatile memory 160 and storage class memory 170. As explained in further detail below, the distributed memory checkpointing system 120 utilizes the storage class memory 170 to implement a distributed memory RAID system over the server nodes 110 to provide fault-tolerant persistent storage of checkpoint images of in-memory data.

The computing system 100 further comprises a backbone network 180 and a distributed data storage system 190. The distributed data storage system 190 comprises a plurality (s) of storage devices 192-1, 192-2, . . . , 192-s (collectively, storage devices 192). The backbone network 180 comprises one or more communications networks to enable peer-to-peer communication (or inter-node communication) between the server nodes 110, as well as one or more storage networks (or storage fabric) to enable network communication between the server nodes 110 and the distributed data storage system 190. The terms "backbone network" or "network" as used herein are intended to be broadly construed so as to encompass a wide variety of different network arrangements, including combinations of multiple networks possibly of different types. In this regard, the backbone network 180 in some embodiments comprises combinations of multiple different types of communications networks each comprising network devices configured to communicate using Internet Protocol (IP) or other related communication protocols. The backbone network 180 comprises intermediate points (such as routers, switches, etc.) and other elements that form a network backbone to establish communication paths and enable communication between network endpoints.

In particular, while the backbone network 180 is generically depicted in FIG. 1, depending on the network distribution and geographic location of the constituent components and nodes of the computing system 100, the backbone network 180 may comprise one or more of types of communications networks that are commonly used to implement cloud computing platforms, such as, but not limited to, a wide area network (WAN), a local area network (LAN), a wireless local area network (WLAN), etc., or a combination of networks that implement communication protocols that are used by the server nodes 110 for inter-node network communication including, but not limited to, protocols such as TCP/IP, Gigabit Ethernet (GbE) (e.g., 10/25/40/100GbE), remote direct memory access (RDMA), Infiniband (IB), Message Passing Interface (MPI), etc. RDMA protocols include, for example, RoCE (RDMA over Converged Ethernet), or iWARP (interne Wide Area RDMA Protocol).

In addition, the backbone network 180 comprises a storage network fabric which can be implemented using any suitable networking system and protocol to enable shared access to the distributed data storage system 190 by the server nodes 110. In another embodiment, the backbone network 180 comprises a converged framework in which the inter-node communication network(s) and storage network(s) are integrated into a converged framework such as a converged Ethernet framework using known techniques.

The distributed data storage system 190 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The data storage devices 192 comprise non-volatile storage media to provide persistent storage resources for the server nodes 110. The data storage devices 192 may include one or more different types of persistent storage devices, or data storage arrays, such as hard disk drives (HDDs) or solid-state drives (SSDs), or other types and combinations of non-volatile memory. In one embodiment, the data storage devices 192 are implemented using, for example, an enterprise-class storage platform comprising high performance, scalable storage arrays, which can be implemented for hyper-scale computing systems.

Furthermore, while the computing system 100 is generically illustrated in FIG. 1, it is to be understood that the computing system 100 can be implemented as part of a private or public computing platform (e.g., an enterprise network, a data center, a cloud computing system, etc.), or other types of computing systems comprising distributed virtual infrastructure and those not comprising virtual infrastructure. The computing system 100 can provide processing services for various types of HPC applications such as Big Data analytics, artificial intelligence, deep learning applications, machine learning applications, and other types of HPC applications with computational workloads which have an inherently parallel nature (e.g., workloads that exhibit data-parallelism) and can be distributed across multiple server nodes for parallel processing. In one embodiment, the server nodes 110 in FIG. 1 represent separate physical server machines which host server applications such as, but not limited to, a Windows server, a Sun Solaris server, an HP server, a Linux server, etc., and other applications. In other embodiments, two or more server nodes can execute on the same physical server machine in a virtualized or container environment.

The distributed memory checkpointing system 120 which executes across the server nodes 110 is configured generate checkpoint images (or snapshots) of in-memory data of applications or processes that execute across one or more of the server nodes 110, and utilize the storage class memory 170 of the server nodes 110 to provide fault-tolerant persistent storage of the checkpoint images of the in-memory data. In particular, the memory checkpoint control modules 130 implement methods that are configured to generate distributed checkpoint images (or snapshots) of the system memory 150 (e.g., volatile memory 160) across multiple server nodes 110. Depending on the system configuration, the checkpoint images can be generated on a per application basis, or for all system memory 150 across the server nodes 110. In one embodiment, the memory checkpoint control modules 130 are configured to store the checkpoint images in the storage class memory 170 in a distributed manner over the server nodes 110.

In addition, the memory RAID control modules 140 are configured to construct and manage a distributed storage class memory RAID system using the storage class memory 170 of the server nodes 110. As explained in further detail below, the distributed storage class memory RAID system is configured to provide fault-tolerant persistent storage of the checkpoint images which are generated by the memory checkpoint control module 130 and distributively stored in the storage class memories 170 of the server nodes 110.

The storage class memory 170 comprises persistent memory which is utilized as an additional tier of system memory to augment the volatile memory 160 (e.g., dynamic random-access memory (DRAM)). The storage class memory 170 can be implemented using non-volatile NAND flash memory or other types of solid-state drive (SSD) memory. The storage class memory 170 is connected to system memory bus and can be utilized by processors as persistent memory with low latency. For example, the storage class memory 170 can be a non-volatile dual in-line memory module (NVDIMM) to provide non-volatile RAM for the server processors. The volatile memory 160 can be implemented as a separate memory module or incorporated as part of the NVDIMM. The storage class memory 170 can be addressed at a byte level or block level. For example, the server node operating systems can configure the storage class memory 170 as block storage devices formatted by file systems and databases. In other embodiments, the storage class memory 170 can be accessed directly using memory mapped files. In other embodiments, hypervisors can abstract and present isolated regions of the storage class memory 170 directly to different virtual machines as either execution memory or a flash-like storage resource.

Figure 2:
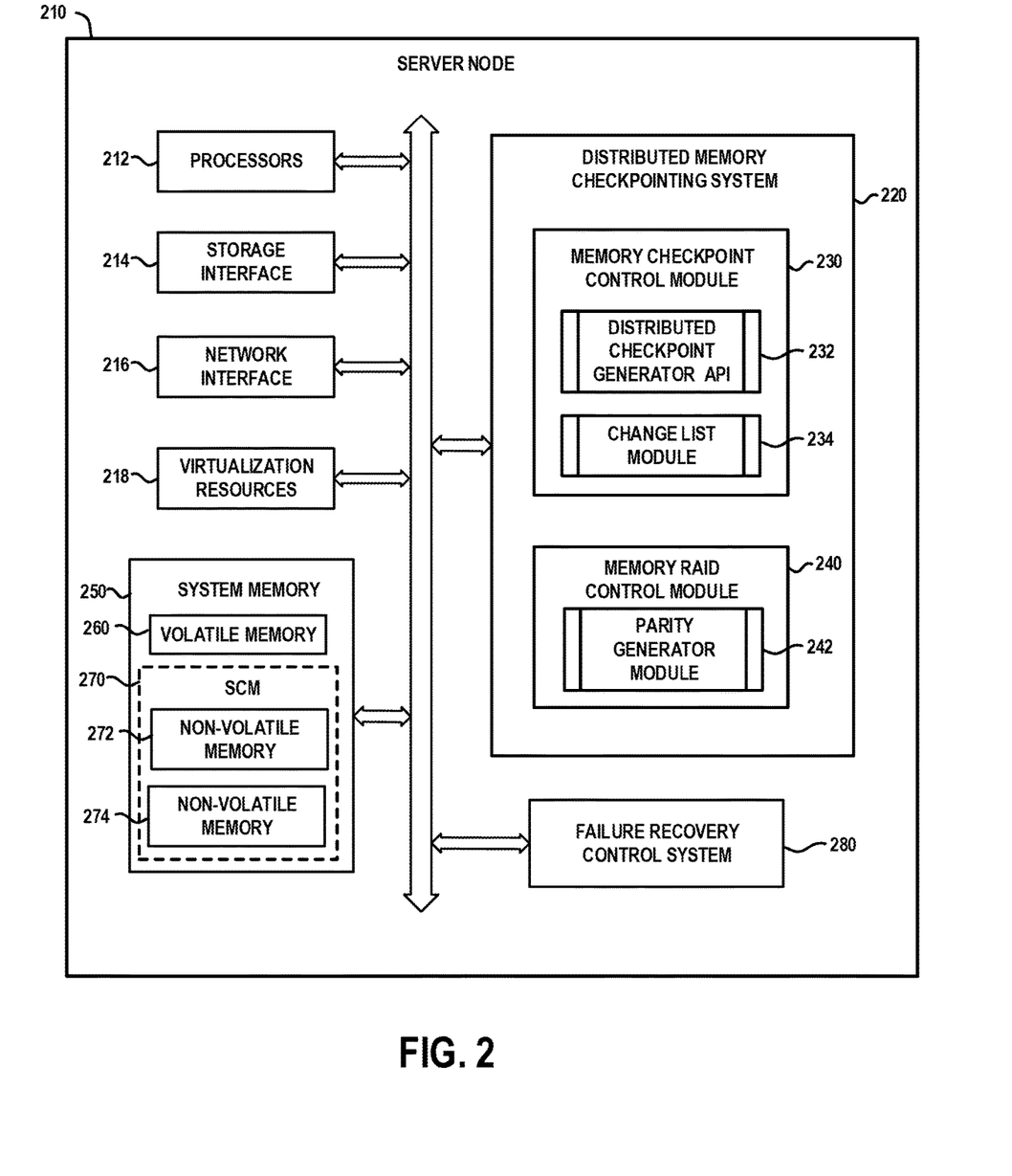
FIG. 2 schematically illustrates an embodiment of a server node which can be implemented in the computing system of FIG. 1, according to an embodiment of the invention.

FIG. 2 schematically illustrates an embodiment of a server node which can be implemented in the computing system of FIG. 1, according to an embodiment of the invention. In particular, FIG. 2 schematically illustrates a server node 210 comprising processors 212, storage interface circuitry 214, network interface circuitry 216, and virtualization resources 218. In addition, similar to the server nodes 110 shown in FIG. 1, the server node 210 comprises a distributed memory checkpointing system 220 comprising a memory checkpoint control module 230 and a memory RAID control module 240, and system memory 250 comprising volatile memory 260 and storage class memory 270. The server node 210 further comprises a failure recovery control system 280 which implements various methods to recover system state using checkpoint images in the event of various types of server failures, the details of which will be explained in further detail below.

The processors 212 comprise one or more types of hardware processors that are configured to process program instructions and data to execute a native operating system (OS) and applications that run on the server node 210. For example, the processors 212 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 214 enables the processors 212 to interface and communicate with the system memory 250, and other local storage and off-infrastructure storage media, using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel ATA (PATA), Serial ATA (SATA), Serial Attached SCSI (SAS), Fibre Channel, etc. The network interface circuitry 216 enables the server node 210 to interface and communicate with a network and other system components. The network interface circuitry 216 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, direct memory access (DMA) and RDMA data transfer protocols, etc.

The virtualization resources 218 can be instantiated to execute one or more applications or functions which are hosted by the server node 210. For example, the virtualization resources 218 can be configured to implement the various modules and functionalities of the distributed memory checkpointing system 220 and the failure recovery control system 280. In one embodiment, the virtualization resources 218 comprise virtual machines that are implemented using a hypervisor platform which executes on the server node 210, wherein one or more virtual machines can be instantiated to execute functions of the server node 210. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 210, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 218 comprise containers such as Docker containers or other types of Linux containers (LXCs). As is known in the art, in a container-based application framework, each application container comprises a separate application and associated dependencies and other components to provide a complete file system, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 210. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the constituent components of distributed memory checkpointing system 220 and the failure recovery control system 280 comprise software modules that are persistently stored in the local storage resources and loaded into the system memory 250 resources (e.g., volatile memory 260), and executed by the processors 212 to perform respective functions as described herein. In this regard, the system memory 250 resources, and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The system memory 250 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 212 to execute a native operating system and one or more applications hosted by the server node 210, and to temporarily store data that is utilized and/or generated by the native OS and application programs running on the server node 210. For example, the volatile memory 260 may be a dynamic random-access memory (DRAM) (e.g., DRAM DIMM (Dual In-line Memory Module), or other forms of volatile RAM. The storage-class memory (SCM) 270 comprises one or more types of non-volatile memory 272 and 274, which are accessible as a memory resource. For example, the non-volatile memory 272 and 274 may be one or more of a NAND Flash storage device, a SSD device, or other types of next generation non-volatile memory (NG-NVM) devices. The non-volatile memory 272 and 274 can be implemented with any suitable NGNVM DIMM, or NGNVM add-in card (AIC) module.

The system memory 250 can be implemented using a hierarchical memory tier structure wherein the volatile system memory 260 is configured as the highest-level memory tier, and the non-volatile system memories 272 and 274 of the SCM 270 are configured as lower level memory tiers which are utilized as high-speed load/store non-volatile memory devices on the processor memory bus (i.e., data is accessed with loads and stores, instead of with I/O reads and writes).

The distributed memory checkpointing system 220 implements methods that are configured to (i) generate local checkpoint images (or snapshots) of in-memory data which is resident in the system memory 250 (e.g., volatile memory 260 such as DRAM) of the server nodes at various points in time, and (ii) generate and store RAID parity information for the local checkpoint images in a distributed manner across the storage class memory 270 of multiple server nodes. With a distributed checkpointing operation, local checkpoint images of the current state of in-memory data associated with a given application or process executing in a distributed parallel manner across a plurality of server nodes is generated and stored in dedicated regions of the storage class memory 270 across multiple server nodes. As noted above, in a distributed computing environment, checkpointing provides some level of fault tolerance for server failures that would otherwise would force a long-running distributed application (e.g., deep learning model training process) to restart from the beginning in the event of system failure (e.g., power loss).

The memory checkpoint control module 230 is configured to manage the creation, storage, and subsequent usage of memory checkpoint images within a distributed framework using various functions and application programming interfaces (APIs) supported by the distributed memory checkpointing system 220. For example, the memory checkpoint control module 230 comprises a distributed checkpoint generator API 232 which implements methods and APIs to create a distributed checkpoint image (or snapshot) of the system memory 250 across multiple server nodes. A checkpoint image can be generated at a given point-in-time on a per application basis, or for the entire system memory of one or more server nodes. In a distributed computing environment where components of an application are executing in parallel across a plurality of server nodes, there will be local application state maintained in the local system memory of each of the plurality of server nodes. The overall state of the application at any given point in time will be an aggregation of the local application states of the application across the server nodes at the given point in time.

To generate a checkpoint image for a given application executing on multiple server nodes (e.g., to generate local checkpoint images of the application on the multiple server nodes), mechanisms are implemented by the distributed checkpoint generator API 232 to ensure that the checkpoint image across the server nodes is crash consistent. For example, the distributed checkpoint generator API 232 can implement methods to temporarily hold or pause inter-node network traffic between all server nodes for the given application so that the checkpoint image will be crash consistent. In other words, the inter-node communication between servers and/or the application execution is quiesced to achieve a consistent application state in preparation of performing the checkpoint operation. In this way, when performing a recovery operation using the checkpoint image, it will be as if there was a disconnection between the server nodes, which all applications should be able to handle. Once a consistent application state is reached, a checkpoint image of the distributed application is generated by taking a snapshot of the address space of the distributed application on each server node hosting the executing of the distributed application.

In another embodiment, if the given application provides support for a distributed checkpoint/snapshot API, then the distributed checkpoint generator API module 232 can call, or otherwise utilize, the distributed checkpoint/snapshot API of the application to ensure that the distributed application is in a consistent state before generating the checkpoint image. In this regard, the distributed checkpoint API of the distributed application is configured to ensure that the application is placed into a safe, consistent state before taking the snapshot of the in-memory data of the application.

The memory checkpoint control module 230 further comprises a change list module 234 which implements methods for creating a change list for the checkpoint images (or snapshots) that are generated. In particular, in some embodiments, while a given checkpoint image (or snapshot) captures an in-memory image which represents an entire state/context of the application at a given point-in-time, the change list module 234 will generate a delta-snapshot image which represents a difference between a current in-memory state of the application at the given time, and a previous in-memory state of the application captured at a previous point-in-time when a previous checkpoint image was generated. In other words, to save memory space, checkpoint operations can be performed to generate checkpoint images of incremental changes in the application state. At each checkpoint, a checkpoint image saves the difference between a current in-memory state and the previously saved in-memory state. This allows several checkpoints to be saved and restored using the same base checkpoint image and a series of difference checkpoint images using techniques well understood by those of ordinary skill in the art.

The memory RAID control module 240 implements methods that are configured to build and manage a storage class memory RAID system using the storage class memory 270 of multiple server nodes within the server cluster. A storage class memory RAID system according to an embodiment of the invention is configured to provide redundancy and parity fault tolerance for a distributed checkpoint image (which comprises a plurality of local checkpoint images distributed over multiple server nodes) to enable complete recovery of the distributed checkpoint image in the event of server failure. The memory RAID control module 240 implements methods that are based on current state of the art data storage virtualization techniques for implementing RAID systems in which multiple physical HDD components are aggregated into one or more logical units for the purposes of data redundancy.

In accordance with embodiments of the invention, the memory RAID control module 240 in each server node is configured to allocate a dedicated region within the storage class memory 270 of the server node as a "parity region" to store RAID parity information which is generated for distributed checkpoint images. The RAID parity information comprises fault-tolerant parity data which is configured to ensure fault tolerance of distributed checkpoint images in the case of one server node (single parity) or two server nodes (dual parity). The memory RAID control module 240 can protect distributed checkpoint images (or snapshots) comprising local checkpoint images stored across the storage class memory 270 of multiple server nodes using one of a plurality of different RAID levels (or RAID configurations). For example, RAID 5 implements a single distributed parity framework, wherein single parity stripes are distributed over server nodes to enable recovery of data in the event of one server node failure. RAID 6 implements a dual-parity framework, wherein two parity stripes are utilized to enable recovery of data in the event of two server node failures.

In a standard RAID system, data striping methods are utilized to divide data (or a stripe) into a plurality of data blocks (or strips, or striped units) which are stored on different disks in a RAID set of disks. In accordance with embodiments of the invention, a distributed checkpoint image comprises a plurality of local checkpoint images that are generated on different server nodes and stored in the SCMs 270 of the server node. In this regard, in the context of a RAID framework, a distributed checkpoint image can be deemed a "stripe", and each constituent local checkpoint image of the distributed checkpoint image can be deemed a "strip".

The memory RAID control module 240 comprises a parity generator module 242 which implements methods that are configured to compute parity information for a distributed checkpoint image having local checkpoint images stored across a plurality of SCMs 270 of the server nodes. In one embodiment, the parity information for a given distributed checkpoint image is calculated using a binary eXclusive OR (XOR) function on the constituent local checkpoint images, and the parity information is stored in one or more parity stripes in dedicated parity regions of the SCMs 270 of the server nodes.

Figure 3A:
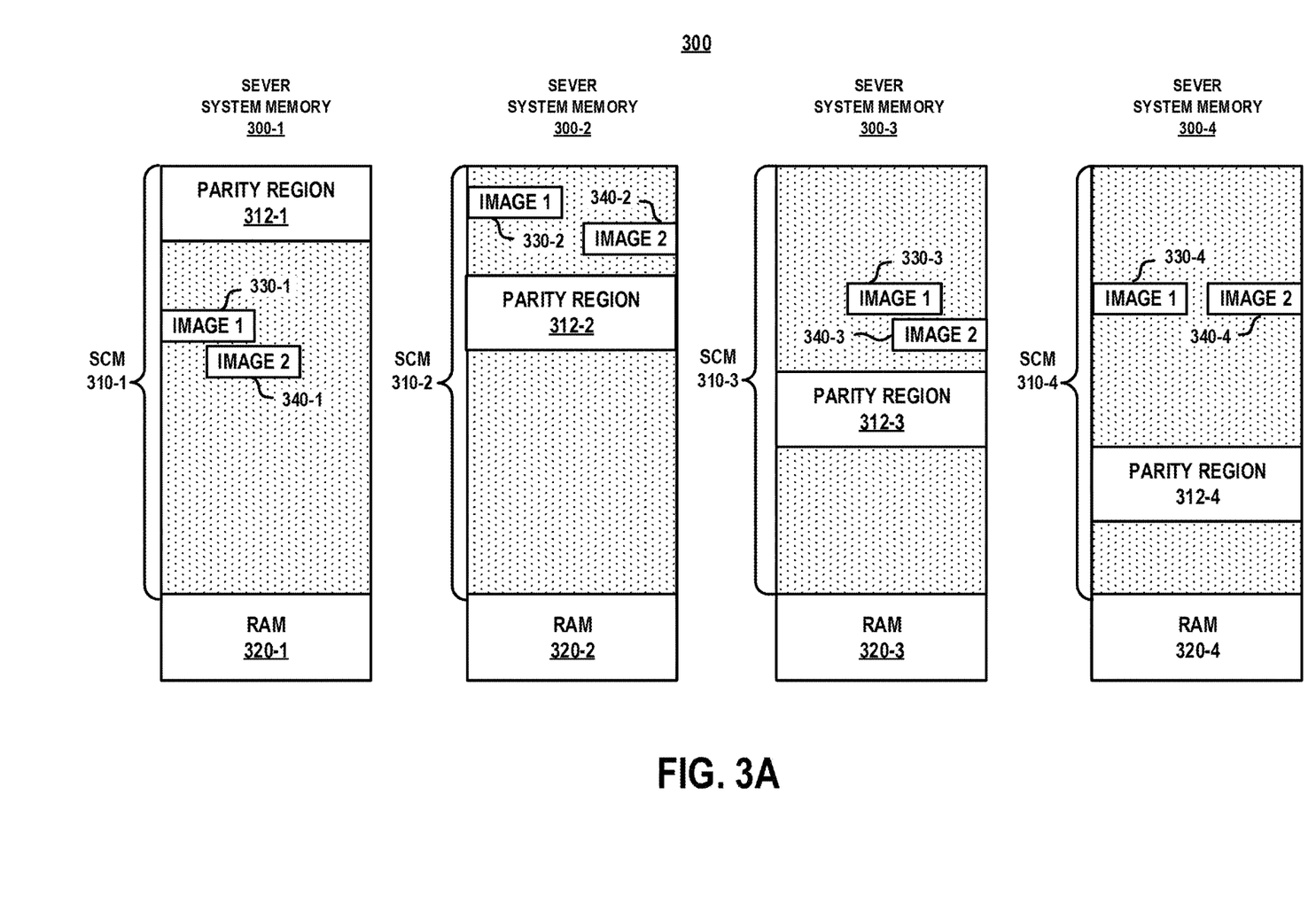
FIGS. 3A and 3B schematically illustrate a distributed storage class memory RAID system according to an embodiment of the invention.
Figure 3B:
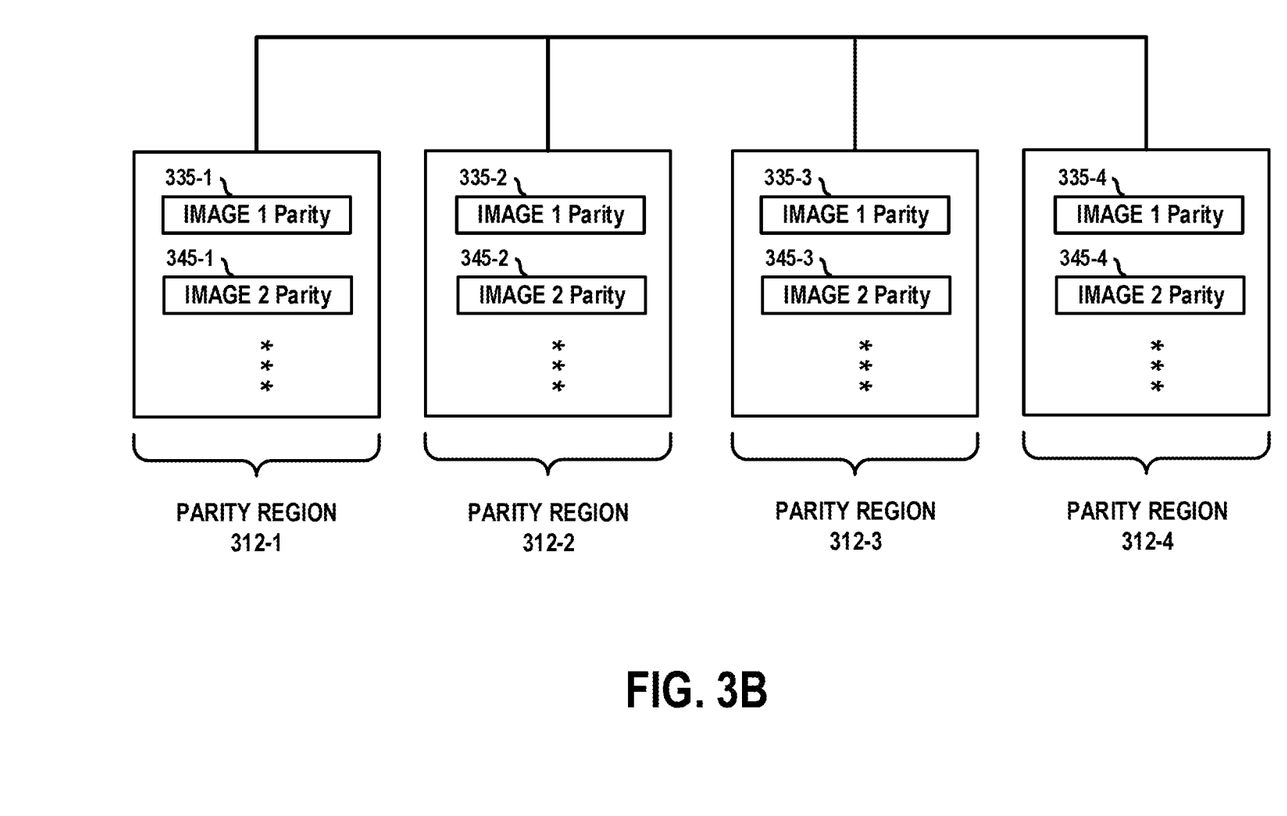

FIGS. 3A and 3B illustrate a storage class memory RAID system according to an embodiment of the invention. In particular, FIG. 3A schematically illustrates a storage class memory RAID system 300 which is constructed over four server nodes comprising system memory 300-1, 300-2, 300-3, and 300-4 of four server nodes, wherein each system memory 300-1, 300-2, 300-3, and 300-4 comprises a respective storage class memory (SCM) 310-1, 310-2, 310-3, and 310-4, and respective volatile RAM 320-1, 320-2, 320-3 and 320-4. Each SCM 310-1, 310-2, 310-3, and 310-4 comprises an allocated (or dedicated) RAID parity region 312-1, 312-2, 312-3, and 312-4, respectively, which are configured to persistently store parity stripes that are generated for distributed checkpoint images that are stored in the storage class memory 310-1, 310-2, 310-3, and 310-4. In one embodiment, the allocated RAID parity regions 312-1, 312-2, 312-3, and 312-4 are equal in size (i.e., the same amount of memory is allocated in each SCM 310-1, 310-2, 310-3, and 310-4 for the dedicated RAID parity regions 312-1, 312-2, 312-3, and 312-4, respectively). In other embodiments, other forms of RAID configurations can be implemented which allow the RAID parity regions 312-1, 312-2, 312-3, and 312-4, to have different sizes.

FIG. 3A illustrates an example embodiment in which two distributed checkpoint images (IMAGE 1 and IMAGE 2) are stored across the SCMs 310-1, 310-2, 310-3, and 310-4 of the four server nodes. In an example embodiment, the distributed checkpoint images IMAGE 1 and IMAGE 2 represent different point-in-time snapshots of in-memory application data (or application states) which is resident in the RAMs 320-1, 320-2, 320-3, and 320-4 for a given application that is executed in a distributed manner over the four server nodes.

More specifically, the distributed checkpoint image IMAGE 1 comprises a plurality of local checkpoint images 330-1, 330-2, 330-3, and 330-4 which are stored in the respective SCMs 310-1, 310-2, 310-3, and 310-4 of the server nodes. The local checkpoint images 330-1, 330-2, 330-3, and 330-4 comprise local snapshots of in-memory data that is resident within the respective RAMs 320-1, 320-2, 320-3 and 320-4 at a first point-in-time during execution of the distributed application across the server nodes. Similarly, the distributed checkpoint image IMAGE 2 comprises a plurality of local checkpoint images 340-1, 340-2, 340-3, and 340-4 which are stored in the respective SCMs 310-1, 310-2, 310-3, and 310-4 of the server nodes. The local checkpoint images 340-1, 340-2, 340-3, and 340-4 comprise local snapshots of in-memory data that is resident within the respective RAMs 320-1, 320-2, 320-3 and 320-4 at a second point-in-time during execution of the distributed application across the server nodes.

The distributed checkpoint image IMAGE 1 can be an initial (or base) in-memory snapshot image of the entire application state which is captured by performing a first (initial) checkpoint operation at some initial point-in-time, and the distributed checkpoint image IMAGE 2 can represent a second in-memory snapshot image of the entire application state which is captured by performing a second checkpoint operation at some subsequent point-in-time. In one embodiment, the distributed checkpoint IMAGE 2 represents a difference between the current application state and the previous application state represented by the previous distributed checkpoint image IMAGE 1. In particular, the local checkpoint images 340-1, 340-2, 340-3, and 340-4 for the distributed checkpoint image IMAGE 2 represent the differences between the current local application states and the previous local application states represented by the local checkpoint images 340-1, 340-2, 340-3, and 340-4 for the previous checkpoint image IMAGE 1. While only two checkpoint images IMAGE 1 and IMAGE 2 are shown in FIG. 3A for ease of illustration and explanation, it is to be understood that any number of distributed checkpoint images can be generated and stored across the SCMs 310-1, 310-2, 310-3, and 310-4 of the server nodes, depending on the application and checkpoint system configuration.

The process of performing local checkpointing operations on each of the server nodes and storing the local checkpoint images in the respective SCMs 310-1, 310-2, 310-3 and 310-4 eliminates the need to physically combine the local checkpointing results from each of the server nodes to generate a complete checkpoint image, and store the complete checkpoint image in one location. In this regard, distributed checkpointing schemes according to embodiments of the invention where local checkpointing operations are performed on the local server nodes to generate and store local checkpoint images are different from conventional methods for single point checkpointing, wherein all the checkpoint data is collected at one node place and stored. The generation and storage of local checkpoint images on local server nodes obviates the need to repeatedly transfer large amounts of data to one central node for checkpointing, and thus avoids wasted computation power, network bandwidth, and storage.

Furthermore, as noted above, to provide an additional level of fault tolerance, parity information is generated for the distributed checkpoint images IMAGE 1 and IMAGE 2 and stored in the RAID parity regions 312-1, 312-2, 312-3, and 312-4 of the SCMs 310-1, 310-2, 310-3 and 310-4. For example, FIG. 3B schematically illustrates an exemplary RAID parity configuration for a RAID level 5 format, wherein a plurality of parity stripes 335-1, 335-2, 335-3, and 335-4 are generated for the distributed checkpoint IMAGE 1 and stored in the RAID parity regions 312-1, 312-2, 312-3, and 312-4, respectively, and wherein a plurality of parity stripes 345-1, 345-2, 345-3, and 345-4 are generated for the distributed checkpoint IMAGE 2 and stored in the RAID parity regions 312-1, 312-2, 312-3, and 312-4, respectively.

As noted above, the parity information for a given distributed checkpoint image is calculated using a binary XOR function on constituent local checkpoint images of the given distributed checkpoint image. In the example embodiment of FIG. 3B wherein the SCM RAID system is configured using a set SCMs over four server nodes (n=4), the parity information for a given distributed checkpoint image can be generated by performing an XOR function on three local checkpoint images resident in the SCMs of three out of four server nodes (n−1), and then storing the resulting parity stripe in the SCM parity region of the SCM memory of the fourth ($n^{th}$) server node.

For example, in the embodiment of FIG. 3B, the parity stripes 335-1, 335-2, 335-3, and 335-4 (respectively denoted P1-1, P1-2, P1-3, and P1-4) for the distributed checkpoint IMAGE 1 are computed using the local checkpoint images 330-1, 330-2, 330-3, and 330-4 (respectively denoted L1-1, L1-2, L1-3, and L1-4) for IMAGE 1 as follows:

$P1\text{-}1 = [(L1\text{-}2 \text{ XOR } L1\text{-}3) \text{ XOR } L1\text{-}4]$ $P1\text{-}2 = [(L1\text{-}1 \text{ XOR } L1\text{-}3) \text{ XOR } L1\text{-}4]$ $P1\text{-}3 = [(L1\text{-}1 \text{ XOR } L1\text{-}2) \text{ XOR } L1\text{-}4]$ $P1\text{-}4 = [(L1\text{-}1 \text{ XOR } L1\text{-}2) \text{ XOR } L1\text{-}3]$ Similarly, in the embodiment of FIG. 3B, the parity stripes 345-1, 345-2, 345-3, and 345-4 (respectively denoted P2-1, P2-2, P2-3, and P2-4) for the distributed checkpoint IMAGE 2 are computed using the local checkpoint images 340-1, 340-2, 340-3, and 340-4 (respectively denoted L2-1, L2-2, L2-3, and L2-4) for IMAGE 2 as follows:

$P2\text{-}1 = [(L2\text{-}2 \text{ XOR } L2\text{-}3) \text{ XOR } L2\text{-}4]$ $P2\text{-}2 = [(L2\text{-}1 \text{ XOR } L2\text{-}3) \text{ XOR } L2\text{-}4]$ $P2\text{-}3 = [(L2\text{-}1 \text{ XOR } L2\text{-}2) \text{ XOR } L2\text{-}4]$ $P2\text{-}4 = [(L2\text{-}1 \text{ XOR } L2\text{-}2) \text{ XOR } L2\text{-}3]$ It is to be noted that to compute the parity information, the local checkpoint images should be equal size (in number of bits). In the event that the local checkpoint images are not equi-size, one or more of the local checkpoint images can be padded with either logic 0 or logic 1 bits to make all local checkpoint images equal in size before computing the parity computation using the binary XOR functions.

The use of parity information for the checkpoint images in the SCM Raid system allows recovery of stored checkpoint images in the event of a non-recoverable failure of a server node or failure of the storage class memory of a given server node, resulting in the loss of checkpoint image data stored in the storage class memory of the failed server node. The recovery methods are the same or similar to those used, for example, for RAID 5 systems, the details of which are fully understood by those of ordinary skill in the art. For example, in the example embodiment of FIGS. 3A and 3B, assume there is an unrecoverable failure of the fourth server node which comprises the system memory 300-4. In this instance, local checkpoint images in the SCM 310-4 (e.g., the local the checkpoint image 330-4 (L1-4) for IMAGE 1, and the local checkpoint image 340-4 (L2-4) for IMAGE 2) of the failed server node would be lost. However, the local the checkpoint images 330-4 (LI-4) and 340-4 (L2-4) for IMAGE 1 and IMAGE 2 can be recovered using the parity information and local checkpoint images for IMAGE 1 and IMAGE 2, which are stored in the SCMs 310-1, 310-2, and 310-3 of the other server nodes.

For example, the local checkpoint image 330-4 (L1-4) for IMAGE 1 can be recovered using any one of the following computations:

$L1\text{-}4 = [(L1\text{-}2 \text{ XOR } L1\text{-}3) \text{ XOR } P1\text{-}1]$ $L1\text{-}4 = [(L1\text{-}1 \text{ XOR } L1\text{-}3) \text{ XOR } P1\text{-}2]$ $L1\text{-}4 = [(L1\text{-}1 \text{ XOR } L1\text{-}2) \text{ XOR } P1\text{-}3]$ Similarly, the local checkpoint image 340-4 (L2-4) for IMAGE 2 can be recovered using any one of the following computations:

$L2\text{-}4 = [(L2\text{-}2 \text{ XOR } L2\text{-}3) \text{ XOR } P2\text{-}1]$ $L2\text{-}4 = [(L2\text{-}1 \text{ XOR } L2\text{-}3) \text{ XOR } P2\text{-}2]$ $L2\text{-}4 = [(L2\text{-}1 \text{ XOR } L2\text{-}2) \text{ XOR } P2\text{-}3]$ In an alternate embodiment, the parity information for a given distributed checkpoint image can be calculated by dividing each local checkpoint image of the distributed checkpoint images into a plurality of equal size blocks, and then computing the parity information over the constituent blocks of the local checkpoint images. This parity scheme will be illustrated using the example embodiment of FIGS. 3A and 3B with four server nodes (n=4), where the local checkpoint images 330-1, 330-2, 330-3, and 330-4 of IMAGE 1 are respectively denoted L1-1, L1-2, L1-3, and L1-4, and where the local checkpoint images 340-1, 340-2, 340-3, and 340-4 of IMAGE 2 are respectively denoted L2-1, L2-2, L2-3, and L2-4.

In this case, each local checkpoint image L1-1, L1-2, L1-3, and L1-4 of the distributed checkpoint image IMAGE 1 is divided into a plurality (n−1) of equal size blocks as follows:

$$L1\text{-}1 \rightarrow (L1\text{-}1a, L1\text{-}1b, L1\text{-}1c)$$

$$L1\text{-}2 \rightarrow (L1\text{-}2a, L1\text{-}2b, L1\text{-}2c)$$

$$L1\text{-}3 \rightarrow (L1\text{-}3a, L1\text{-}3b, L1\text{-}3c)$$

$$L1\text{-}4 \rightarrow (L1\text{-}4a, L1\text{-}4b, L1\text{-}4c)$$

Similarly, each local checkpoint image L2-1, L2-2, L2-3, and L2-4 of the distributed checkpoint image IMAGE 2 is divided into a plurality (n−1) of equal size blocks as follows:

$$L2\text{-}1 \rightarrow (L2\text{-}1a, L2\text{-}1b, L2\text{-}1c)$$

$$L2\text{-}2 \rightarrow (L2\text{-}2a, L2\text{-}2b, L2\text{-}2c)$$

$$L2\text{-}3 \rightarrow (L2\text{-}3a, L2\text{-}3b, L2\text{-}3c)$$

$$L2\text{-}4 \rightarrow (L2\text{-}4a, L2\text{-}4b, L2\text{-}4c)$$

In the embodiment of FIG. 3B, assuming the parity stripes 335-1, 335-2, 335-3, and 335-4 for the distributed checkpoint image IMAGE 1 are respectively denoted P1-1, P1-2, P1-3, and P1-4, the parity information for IMAGE 1 can be computed as follows:

$$P1\text{-}1 = [(L1\text{-}2a \text{ XOR } L1\text{-}3a) \text{ XOR } L1\text{-}4a]$$

$$P1\text{-}2 = [(L1\text{-}1a \text{ XOR } L1\text{-}3b) \text{ XOR } L1\text{-}4b]$$

$$P1\text{-}3 = [(L1\text{-}1b \text{ XOR } L1\text{-}2b) \text{ XOR } L1\text{-}4c]$$

$$P1\text{-}4 = [(L1\text{-}1c \text{ XOR } L1\text{-}2c) \text{ XOR } L1\text{-}3c]$$

Similarly, assuming the parity stripes 345-1, 345-2, 345-3, and 345-4 for the distributed checkpoint image IMAGE 2 shown in FIG. 3B are respectively denoted P2-1, P2-2, P2-3, and P2-4, the parity information for IMAGE 2 can be computed as follows:

$$P2\text{-}1 = [(L2\text{-}2a \text{ XOR } L2\text{-}3a) \text{ XOR } L2\text{-}4a]$$

$$P2\text{-}2 = [(L2\text{-}1a \text{ XOR } L2\text{-}3b) \text{ XOR } L2\text{-}4b]$$

$$P2\text{-}3 = [(L2\text{-}1b \text{ XOR } L2\text{-}2b) \text{ XOR } L2\text{-}4c]$$

$$P2\text{-}4 = [(L2\text{-}1c \text{ XOR } L2\text{-}2c) \text{ XOR } L2\text{-}3c]$$

In this example embodiment, the parity data on each server node will be less than (e.g., one-third) of the total size of the checkpoint data on each server node, but each local checkpoint image will need to be recovered from the parity information on different servers. For example, in the example embodiment of FIGS. 3A and 3B, assume there is an unrecoverable failure of the fourth server node which comprises the system memory 300-4. In this instance, local checkpoint images in the SCM 310-4 (e.g., the local the checkpoint image 330-4 (L1-4) for IMAGE 1, and the local checkpoint image 340-4 (L2-4) for IMAGE 2) of the failed server node would be lost. However, the local the checkpoint images 330-4 (L1-4) and 340-4 (L2-4) for IMAGE 1 and IMAGE 2 can be recovered using the parity information and local checkpoint images for IMAGE 1 and IMAGE 2, which are stored in the SCMs 310-1, 310-2, and 310-3 of the other server nodes.

In particular, the constituent blocks (L1-4a, L1-4b, L1-4c) of the local checkpoint image 330-4 (L1-4) for IMAGE 1 can be recovered by the following computations:

$$L1\text{-}4a = [(L1\text{-}2a \text{ XOR } L1\text{-}3a) \text{ XOR } P1\text{-}1]$$

$$L1\text{-}4b = [(L1\text{-}1a \text{ XOR } L1\text{-}3b) \text{ XOR } P1\text{-}2]$$

$$L1\text{-}4c = [(L1\text{-}1b \text{ XOR } L1\text{-}2b) \text{ XOR } P1\text{-}3]$$

Similarly, the constituent blocks (L2-4a, L2-4b, L2-4c) of the local checkpoint image 340-4 (L2-4) for IMAGE 2 can be recovered by the following computations:

$$L2\text{-}4a = [(L2\text{-}2a \text{ XOR } L2\text{-}3a) \text{ XOR } P2\text{-}1]$$

$$L2\text{-}4b = [(L2\text{-}1a \text{ XOR } L2\text{-}3b) \text{ XOR } P2\text{-}2]$$

$$L2\text{-}4c = [(L2\text{-}1b \text{ XOR } L2\text{-}2b) \text{ XOR } P2\text{-}3]$$

In an alternate embodiment, the parity information for a given distributed checkpoint image can be calculated using a binary XOR function on all constituent local checkpoint images of the given distributed checkpoint image, and the parity information can be stored in the SCM of another server (e.g., dedicated RAID parity server node). For example, in the example embodiment of FIGS. 3A and 3B, parity information (P1) and (P2) for the respective distributed checkpoint images IMAGE 1 and IMAGE 2 can be computed as follows:

$$P1 = [((L1\text{-}1 \text{ XOR } L1\text{-}2) \text{ XOR } L1\text{-}3) \text{ XOR } L1\text{-}4]$$

$$P2 = [((L2\text{-}1 \text{ XOR } L2\text{-}2) \text{ XOR } L2\text{-}3) \text{ XOR } L2\text{-}4]$$

The parity information P1 and P2 would be stored in the SCM of another server node which does not have any of the local checkpoint images of IMAGE 1 and IMAGE 2 stored in the SCM of the server node.

While a RAID 5 configuration is presented for illustrative purposes, it is to be understood that an SCM-based RAID system can be implemented using any desired RAID level configuration, depending on the application. It is to be noted that with SCM RAID systems described herein, except for the parity computation and storage, there is no data movement between the server nodes. While there is inter-node communication to coordinate the creation of local checkpoint images for a distributed checkpoint operation, the distributed checkpoint operation is performed with no checkpoint data movement between the server nodes, and the parity is computed asynchronously at some point after completion of the checkpoint operation.

Figure 4:
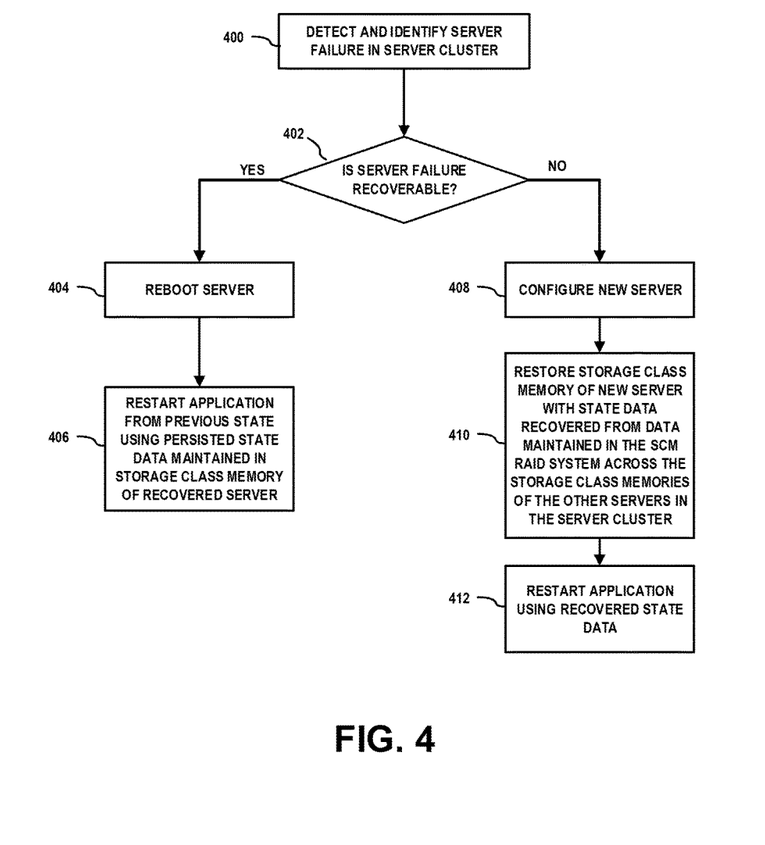
FIG. 4 is a flow diagram which illustrates methods for recovering from system failures using distributed storage class memory checkpointing techniques according to embodiments of the invention.

It is to be appreciated that SCM memory checkpointing systems and methods discussed herein enable fault recovery for various types of system failures. In the event a system failure, the failure recovery control system 280 executes methods to recover from the system failures. The failure recovery control system 280 implements methods to recover from server crashes with are either recoverable or non-recoverable. For example, FIG. 4 is a flow diagram which illustrates methods for recovering from system failures using distributed SCM memory checkpointing techniques according to embodiments of the invention. It is to be understood that FIG. 4 illustrates exemplary operating modes of the failure recovery control system 280 (FIG. 2).

Referring to FIG. 4, a server failure is detected and identified in the server cluster (block 400). A determination is made as to whether the server failure is recoverable (block 402). For example, a server failure (or server crash) can occur due to power outage, overload, configuration error, etc., in which cases the server failure is recoverable. If the server failure is deemed recoverable (affirmative determination in block 402), the server is rebooted (block 404). An application executing on the server cluster is then restarted from a previous state using the persisted state data maintained in the storage class memory of the recovered server (block 406).

In one embodiment, the application can be restarted from the point where it stopped as a result of the system failure by using the latest application state stored in a non-volatile system memory of the SCM of the rebooted server node. This mode of recovery is available when the latest application state is stored in non-volatile system memory and the application is configured to support such mode. In another embodiment, in instances where the server failure is the result of a configuration error due to a bug or some other source of corruption, or instances where the application is configured to only recover from a specific checkpoint, the server nodes executing the application can be recovered to a previous state using the most recent checkpoint image or another checkpoint image. In this instance, checkpoint image data of a target checkpoint can be loaded from the SCMs on the server nodes, and the application is restarted from the previous checkpointed state using the checkpoint data.

On the other hand, if the server failure is deemed non-recoverable (negative determination in block 402), the application state will need to be recovered using checkpoint image data reconstructed from data maintained in the SCM Raid system of the existing servers in the server cluster. A non-recoverable server failure refers to any server failure which results in loss of the persistent checkpoint data that was stored in the SCM or other persistent storage of the failed server node. In this instance, a new server node is configured in the server cluster (block 408), and the SCM of the new server node is restored with state data that is recovered from data maintained in the SCM RAID regions of the SCMs of the other server nodes in the server cluster (block 410). With this process, the SCM of the new server node can be populated with the distributed checkpoint data of some or all of the local checkpoint images that were stored in the SCM of the failed server node, and a newly dedicated SCM RAID region of the SCM of the new server node can be populated with the data that existed in the dedicated SCM RAID region of the SCM of the failed server node. The application is then restarted on the new server node using the recovered state data (block 412).

In another embodiment, the data recovery for the new server node can be performed by creating an emulation of a memory layer on one or more previously existing server nodes wherein the lost server memory data is incrementally rebuilt using page faults. In particular, in this embodiment, a copy of the application that ran on the failed server node is run on one of the remaining server nodes. Each time the application attempts to access memory of the failed server node, a page fault will occur, and the system will read the memory data from the checkpoint image data maintained in and/or recovered from the SCM RAID system. The application will need to be restarted to run against one of the checkpoint images, since there was data loss. In this manner, there is no need to rebuild the server memory, and the data will be copied on demand.

In another embodiment, rather than configure a new server node and populate the SCM memory of the new server node with recovered checkpoint data, a virtual memory system can be instantiated on one of the existing servers, and populated with the recovered checkpoint data in fast manner. Thereafter, a new server node can be configured, and the recovered checkpoint data in the virtual memory of the existing server can be staged into the SCM of the newly configured server node.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    running a distributed application on a plurality of server nodes in a server cluster, wherein each server node of the plurality of server nodes includes local system memory which comprises volatile and non-volatile portions;
    maintaining a current application state of the distributed application in the local system memories of the plurality of server nodes, wherein the current application state comprises a distributed application state comprising a plurality of local application states of the distributed application which are stored in respective local system memories of the plurality of server nodes;
    performing a local checkpoint operation on each server node of the plurality of server nodes to generate a distributed checkpoint image of the current application state of the distributed application, wherein the distributed checkpoint image comprises a plurality of local checkpoint images that are associated with respective ones of the local application states of the distributed application which are stored in the respective local system memories of the plurality of server nodes;
    storing the local checkpoint images of the distributed checkpoint image in respective local non-volatile portions of the respective local system memories of the plurality of server nodes;
    generating fault-tolerant parity data for the distributed checkpoint image; and
    storing the fault-tolerant parity data for the distributed checkpoint image in the local non-volatile portions of the local system memories of one or more server nodes of the plurality of server nodes that are running the distributed application, wherein the fault-tolerant parity data is configured to enable recovery of the distributed checkpoint image in an event of a failure of at least one server node of the plurality of server nodes that are running the distributed application.

2. The method of claim 1, wherein storing the fault-tolerant parity data for the distributed checkpoint image in the local non-volatile portions of the local system memories of one or more server nodes of the plurality of server nodes comprises:
    allocating a dedicated parity region in the local non-volatile portions of the local system memories of each server node of the plurality of server nodes; and
    storing the fault-tolerant parity data in the dedicated parity region of the local non-volatile portions of the local system memories of one or more server nodes of the plurality of server nodes.

3. The method of claim 1, wherein performing the local checkpoint operation on each server node of the plurality of server nodes to generate the distributed checkpoint image comprises:

quiescing an application state of the distributed application executing on the plurality of server nodes to achieve a consistent application state in preparation of performing the local checkpoint operation on each server node of the plurality of server nodes.

4. The method of claim 1, wherein the fault-tolerant parity data is generated and stored according to one of a RAID (redundant array of independent disks) level 5 framework and a RAID level 6 framework.

5. The method of claim 1, wherein the distributed checkpoint image comprises at least (i) a first local checkpoint image of the current application state, which is stored in the local non-volatile portion of the local system memory of a first server node of the plurality of server nodes, and (ii) a second local checkpoint image of the current application state, which is stored in the local non-volatile portion of the local system memory of a second server node of the plurality of server nodes;

wherein generating the fault-tolerant parity data for the distributed checkpoint image comprises performing a binary exclusive OR operation on at least the first and second local checkpoint images; and wherein storing the fault-tolerant parity data for the distributed checkpoint image in the local non-volatile portions of the local system memories of one or more server nodes of the plurality of server nodes comprises storing the fault-tolerant parity data for the first and second local checkpoint images in a local system memory of at least a third server node of the plurality of server nodes, which is different from the first and second server nodes.

6. The method of claim 1, further comprising, wherein in response to a server failure of one of the server nodes of the plurality of server nodes, performing a failure recovery operation to restore an application state of the distributed application using at least one of (i) the distributed checkpoint image in the local non-volatile portions of the local system memories of the plurality of server nodes and (ii) the local checkpoint images of the distributed checkpoint image which are stored in the respective local non-volatile portions of the local system memories of two or more server nodes of the plurality of server nodes, and the fault-tolerant parity data for the distributed checkpoint image.

7. The method of claim 6, wherein performing the failure recovery operation comprises:

recovering a portion of the distributed checkpoint image which is lost as a result of the server failure; and storing the recovered portion of the distributed checkpoint image in a local non-volatile portion of a local system memory of a newly configured server node.

8. The method of claim 6, wherein performing the failure recovery operation comprises:

recovering a portion of the distributed checkpoint image which is lost as a result of the server failure; and storing the recovered portion of the distributed checkpoint image in a virtual memory region allocated in the local system memory of an existing server of the plurality of server nodes.

9. An article of manufacture comprising a processor-readable storage medium having stored therein program code of one or more software programs, wherein the program code is executable by one or more processors to implement a process comprising:

running a distributed application on a plurality of server nodes in a server cluster, wherein each server node of the plurality of server nodes includes local system memory which comprises volatile and non-volatile portions;

maintaining a current application state of the distributed application in the local system memories of the plurality of server nodes, wherein the current application state comprises a distributed application state comprising a plurality of local application states of the distributed application which are stored in respective local system memories of the plurality of server nodes;

performing a local checkpoint operation on each server node of the plurality of server nodes to generate a distributed checkpoint image of the current application state of the distributed application, wherein the distributed checkpoint image comprises a plurality of local checkpoint images that are associated with respective ones of the local application states of the distributed application which are stored in the respective local system memories of the plurality of server nodes;

storing the local checkpoint images of the distributed checkpoint image in respective local non-volatile portions of the respective local system memories of the plurality of server nodes;

generating fault-tolerant parity data for the distributed checkpoint image; and storing the fault-tolerant parity data for the distributed checkpoint image in the local non-volatile portions of the local system memories of one or more server nodes of the plurality of server nodes that are running the distributed application, wherein the fault-tolerant parity data is configured to enable recovery of the distributed checkpoint image in an event of a failure of at least one server node of the plurality of server nodes that are running the distributed application.

10. The article of manufacture of claim 9, wherein storing the fault-tolerant parity data for the distributed checkpoint image in the local non-volatile portions of the local system memories of one or more server nodes of the plurality of server nodes comprises:

allocating a dedicated parity region in the local non-volatile portions of the local system memories of each server node of the plurality of server nodes; and storing the fault-tolerant parity data in the dedicated parity region of the local non-volatile portions of the local system memories of one or more server nodes of the plurality of server nodes.

11. The article of manufacture of claim 9, wherein performing the local checkpoint operation on each server node of the plurality of server nodes to generate the distributed checkpoint image comprises:

quiescing an application state of the distributed application executing on the plurality of server nodes to achieve a consistent application state in preparation of performing the local checkpoint operation on each server node of the plurality of server nodes.

12. The article of manufacture of claim 9, wherein the fault-tolerant parity data is generated and stored according to one of a RAID (redundant array of independent disks) level 5 framework and a RAID level 6 framework.

13. The article of manufacture of claim 9, wherein the distributed checkpoint image comprises at least (i) a first local checkpoint image of the current application state, which is stored in the local non-volatile portion of the local system memory of a first server node of the plurality of server nodes, and (ii) a second local checkpoint image of the current application state, which is stored in the local non-volatile portion of the local system memory of a second server node of the plurality of server nodes;

wherein generating the fault-tolerant parity data for the distributed checkpoint image comprises performing a binary exclusive OR operation on at least the first and second local checkpoint images; and wherein storing the fault-tolerant parity data for the distributed checkpoint image in the local non-volatile portions of the local system memories of one or more server nodes of the plurality of server nodes comprises storing the fault-tolerant parity data for the first and second local checkpoint images in a local system memory of at least a third server node of the plurality of server nodes, which is different from the first and second server nodes.

14. The article of manufacture of claim 9, further comprising program code that is executable by the one or more processors for performing a failure recovery operation in response to a server failure of one of the server nodes of the plurality of server nodes, wherein the failure recovery operation comprises restoring an application state of the distributed application using at least one of (i) the distributed checkpoint image in the local non-volatile portions of the local system memories of the plurality of server nodes and (ii) the local checkpoint images of the distributed checkpoint image stored in the local non-volatile portions of the local system memories of two or more server nodes of the plurality of server nodes, and the fault-tolerant parity data for the distributed checkpoint image.

15. A system, comprising:
a server cluster comprising a plurality of server nodes, wherein each server node of the plurality of server nodes includes local system memory which comprises volatile and non-volatile portions, wherein the plurality of server nodes are configured to run a distributed application and maintain a current application state of the distributed application in the local system memories of the plurality of server nodes, wherein the current application state comprises a distributed application state comprising a plurality of local application states of the distributed application which are stored in respective local system memories of the plurality of server nodes; and a distributed memory checkpointing system hosted by the plurality of server nodes in the server cluster, wherein the distributed memory checkpointing system executes a process comprising:

performing a local checkpoint operation on each server node of the plurality of server nodes to generate a distributed checkpoint image of the current application state of the distributed application, wherein the distributed checkpoint image comprises a plurality of local checkpoint images that are associated with respective ones of the local application states of the distributed application which are stored in the respective local system memories of the plurality of server nodes;

storing the local checkpoint images of the distributed checkpoint image in respective local non-volatile portions of the respective local system memories of the plurality of server nodes;

generating fault-tolerant parity data for the distributed checkpoint image; and storing the fault-tolerant parity data for the distributed checkpoint image in the local non-volatile portions of the local system memories of one or more server nodes of the plurality of server nodes that are running the distributed application, wherein the fault-tolerant parity data is configured to enable recovery of the distributed checkpoint image in an event of a failure of at least one server node of the plurality of serve nodes that are running the distributed application.

16. The system of claim 15, wherein in performing the local checkpoint operation on each server node of the plurality of server nodes to generate the distributed checkpoint image, the distributed memory checkpointing system executes a process comprising:

quiescing an application state of the distributed application executing on the plurality of server nodes to achieve a consistent application state in preparation of performing the local checkpoint operation on each server node of the plurality of server nodes.

17. The system of claim 15, wherein the distributed checkpoint image comprises at least (i) a first local checkpoint image of the current application state, which is stored in the local non-volatile portion of the local system memory of a first server node of the plurality of server nodes, and (ii) a second local checkpoint image of the current application state, which is stored in the local non-volatile portion of the local system memory of a second server node of the plurality of server nodes;

wherein generating the fault-tolerant parity data for the distributed checkpoint image comprises performing a binary exclusive OR operation on at least the first and second local checkpoint images; and wherein storing the fault-tolerant parity data for the distributed checkpoint image in the local non-volatile portions of the local system memories of one or more server nodes of the plurality of server nodes comprises storing the fault-tolerant parity data for the first and second local checkpoint images in a local system memory of at least a third server node of the plurality of server nodes, which is different from the first and second server nodes.

18. The system of claim 15, further comprising a failure recovery system hosted by the plurality of server nodes in the server cluster, wherein the failure recovery system executes a failure recovery process in response to a server failure of one of the server nodes of the plurality of server nodes, wherein the failure recovery process comprises restoring an application state of the distributed application using at least one of (i) the distributed checkpoint image in the local non-volatile portions of the local system memories of the plurality of server nodes and (ii) the local checkpoint images of the distributed checkpoint image which are stored in the respective local non-volatile portions of the local system memories of two or more server nodes of the plurality of server nodes, and the fault-tolerant parity data for the distributed checkpoint image.

19. The system of claim 15, wherein in storing the fault-tolerant parity data for the distributed checkpoint image in the local non-volatile portions of the local system memories of one or more server nodes of the plurality of server nodes, the distributed memory checkpointing system executes a process comprising:

allocating a dedicated parity region in the local non-volatile portions of the local system memories of each server node of the plurality of server nodes; and storing the fault-tolerant parity data in the dedicated parity region of the local non-volatile portions of the local system memories of one or more server nodes of the plurality of server nodes.

20. The system of claim 15, wherein the fault-tolerant parity data is generated and stored according to one of a RAID (redundant array of independent disks) level 5 framework and a RAID level 6 framework.

* * * * *